United States Patent [19]
Pitner

[11] 3,883,194
[45] May 13, 1975

[54] DEVICE FOR MOUNTING A RADIAL ROLLING BEARING

[75] Inventor: Alfred Pitner, Paris, France

[73] Assignee: Nadella, France; a part interest

[22] Filed: July 23, 1973

[21] Appl. No.: 381,395

[30] Foreign Application Priority Data
July 24, 1972  France ............................ 72.26534

[52] U.S. Cl. ............................................. 308/184
[51] Int. Cl. ............................................ F16c 43/00
[58] Field of Search ................................. 308/184 R

[56] References Cited
UNITED STATES PATENTS
3,630,586  12/1971  Pitner............................ 308/184 R
FOREIGN PATENTS OR APPLICATIONS
1,204,156  9/1970  United Kingdom Primary Examiner—M. Henson Wood, Jr.
Assistant Examiner—Richard A. Bertsch
Attorney, Agent, or Firm—Robert E. Burns; Emmanuel J. Lobato; Bruce L. Adams

[57] ABSTRACT

In the bore of the support there is fitted a sheath of, for example, plastics material or cardboard, which surrounds a collar of elastomer having a centre opening in which is engaged a very thin steel sleeve whose inner surface constitutes the outer raceway of a ring arrangement of needles guided in a cage and in a rolling contact with the outer surface of a shaft. The thin sleeve is preformed in accordance with an irregular profile which defines three cylindrical segments of large diameter which alternate with inwardly offset cylindrical segments which define for the needles a reduced, and preferably zero, clearance for their circulation.

23 Claims, 9 Drawing Figures

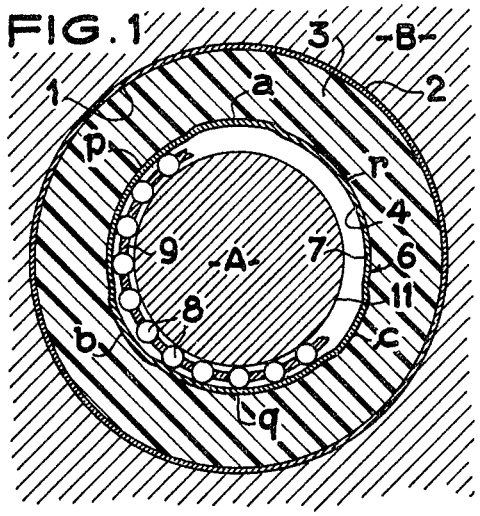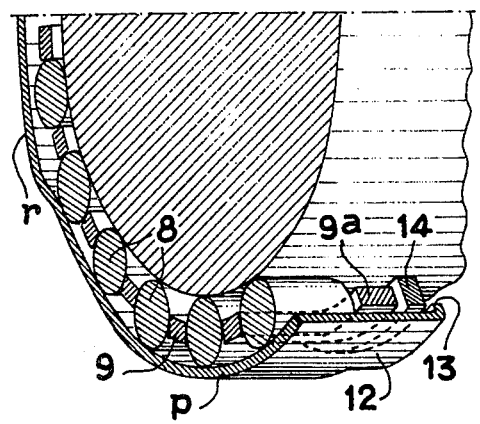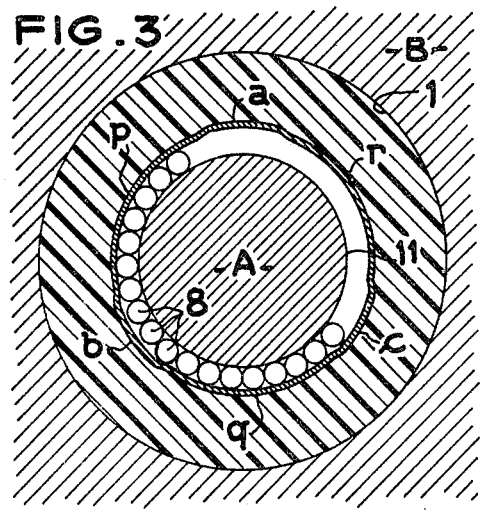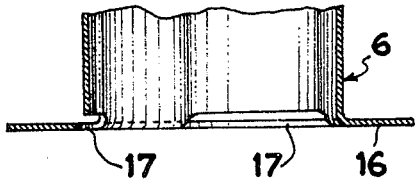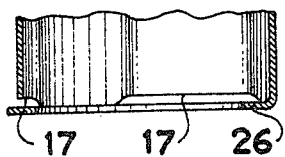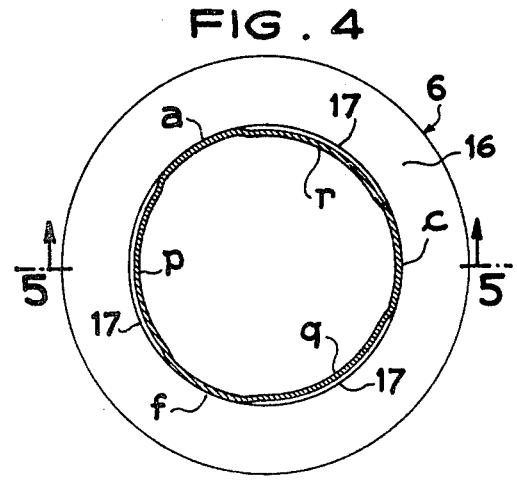

DEVICE FOR MOUNTING A RADIAL ROLLING BEARING

The present invention relates to improvements in a device for mounting a radial rolling bearing comprising an elastically yieldable collar in which is engaged a thin sleeve whose inner surface, which acts as a raceway for the needles or rollers, defines in a plurality of angularly spaced regions a reduced clearance for the circulation of the rolling elements, namely the needles or rollers of the bearing. Owing to its thinness, the sleeve has an elasticity which enables it to deform radially under the action of the forces transmitted by the needles or rollers of the bearing.

In French Pat. No. 1,507,257 which discloses such an arrangement, the reduced or zero clearance is due to a localized compression of a thin cylindrical sleeve produced by an extra thickness provided in the corresponding regions of the elastically yieldable collar. In some applications, such as the mounting of a steering column of an automobile vehicle, the radial forces may be considerable, whereas the elastically yieldable collar has a very important additional function to perform, namely the absorption of the vibrations received in the course of operation of the vehicle, and this requires that the collar be made from relatively thick and very flexible elastomer material. Under these conditions, it is practically impossible to construct the collar in such manner that it is capable of producing sufficient pressure locally on the thin cylindrical sleeve to achieve the desired reduction in the clearance for the rolling elements and maintain this reduced clearance in operation.

An object of the present invention is to provide an arrangement which differs from the known arrangement and in which the sleeve is preformed in accordance with an irregular profile which defines circumferentially alternate cylindrical segments having a diameter providing a conventional radial clearance for the rolling elements and cylindrical segments which are inwardly offset and constitute regions defining a reduced or zero radial clearance for the circulation of the rolling elements. The reduction in the clearance is thus previously achieved independently of the compression exerted by the elastically yieldable collar owing to a preforming of the sleeve, which may be obtained in a relatively simple manner by press forming and drawing in a suitable die. The elastically yieldable collar according to the present invention will intimately surround under pressure the offset cylindrical regions so as to assist them to absorb the radial forces transmitted thereto by the rolling elements.

The use, in a rolling bearing comprising regions of reduced or zero clearance for the rolling elements, of a preformed thin sleeve in which there are provided in succession segments of different diameters is already known, in particular from the aforementioned French patent, but in the prior arrangements the thin sleeve bears directly on a rigid support without interposition of an elastically yieldable collar. In the case of the present invention, the loads are transmitted not by deformation of the preformed sleeve between the rigid support segments but by deformations of the elastically yieldable collar against which bear both the segments having a reduced diameter and the other segments. The fact of avoiding any rigid, and possibly mechanical, contact for the transmission of the load is, moreover, the essential condition for the non-transmission of vibrations.

In order to maintain the general shape of the thin sleeve and thus allow the offset regions in which the clearance is reduced to deform radially in such manner that the generatrices remain parallel to each other and to the axis of the bearing, it is advantageous to provide special arrangements for equalizing as far as possible the resistance to this deformation throughout the length of a given generatrix.

Thus there could be provided instead of a shoulder which could act as a stiffening rib at the end of the offset segments, tab portions which axially retain a floating washer which can come into sliding contact with one of the ends of the rolling elements or one of the edges of a cage containing the rolling elements. The correct orientation of the rolling elements, which are preferably needles, is thus maintained and the rolling elements located in a region of large diameter of the sleeve can enter a region of reduced diameter without jarring or deviation of the rolling elements.

This advantageous performance of the rolling elements may be still further improved by such dimensioning of the inwardly offset regions defining the reduced or zero clearance that a large number of diametrally opposed rolling elements are capable of being located in the offset regions.

It is also possible to provide at at least one of the ends of the sleeve a radial flange having circumferentially extending cut-away parts adjacent the inwardly offset regions so as to stiffen the whole of the sleeve while allowing freedom of radial deformation of the offset portions. The radial flange may extend outwardly or inwardly of the sleeve.

In order to protect the elastically yieldable collar when the rolling bearing is introduced into its housing, the collar may be contained in a sheath, for example of plastics material, the presence of which may render unnecessary a finishing of the inner surface of the housing receiving the bearing.

It is also possible to seal the device by providing on the elastically yieldable collar at least one annular extension defining a lip portion affording a radial seal which can be arranged to be partially in contact with the radial tab portions of the preformed sleeve.

Further features and advantages of the invention will be apparent from the ensuing description with reference to the accompanying drawing.

In the drawing:

FIG. 1 is a sectional view of a rolling bearing mounted in its housing or support;

FIG. 2 is a perspective view of the sleeve and needles of the bearing shown in FIG. 1 and shows the axial retention of a washer adjacent the needles;

FIG. 3 is a view similar to FIG. 1 of a modification;

FIG. 4 is an end elevational view of a sleeve provided with a radial flange;

FIG. 5 is a sectional view taken on line 5—5 of FIG. 4;

FIG. 6 is a partial end elevational view of a modification of the sleeve shown in FIG. 4;

FIG. 7 is a corresponding partial axial sectional view of the modification shown in FIG. 6;

FIG. 8 is a partial perspective view of a sleeve having radial retaining flanges.

Figure 9:
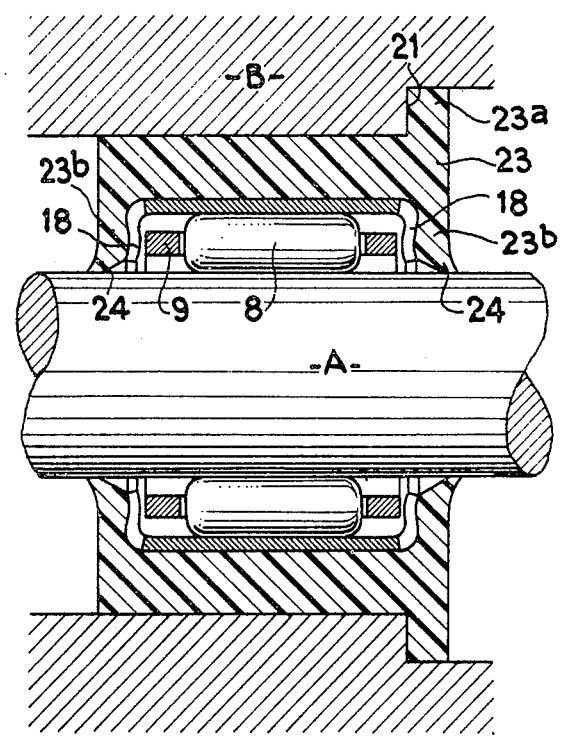
FIG. 9 is a longitudinal sectional view of a rolling bearing including the sleeve illustrated in FIG. 8.

In the bore 1 of the support or housing B shown in FIG. 1 there is fitted a sheath 2, for example of plastics material or cardboard, which surrounds an elastically yieldable collar 3, for example of elastomer, having a centre opening 4 in which is engaged a very thin steel sleeve 6 whose inner surface 7 constitutes an outer raceway for a ring arrangement of needles 8 which are guided in a cage 9 and in rolling contact with an outer surface 11 of a shaft A.

The thin sleeve 6 is preformed to have an irregular profile which defines three cylindrical segments of large diameter $a$, $b$, $c$ which alternate with cylindrical segments $p$, $q$, $r$ which are inwardly offset so as to define a reduced, and preferably zero, clearance for the circulation of the needles 8.

The circumferentially-spaced regions $p$, $q$, $r$ subtend angles of more than 60° at the centre, that is to say, their circumferential extent exceeds that of the intermediate regions $a$, $b$, $c$ of larger diameter so that diametrally opposed needles are located simultaneously in the inwardly offset regions where the clearance is reduced.

The contour of the opening 4 of the elastomer collar 3 may be itself preformed so as to correspond to or fit the profile of the thin sleeve while exerting a uniform pressure on the outer surface of the sleeve.

According to the teaching of French Pat. No. 2,036,443, it is possible to employ a split sleeve 4 and thereby increase its radial elasticity.

As shown in FIG. 2, each region $p$, $q$, $r$ defining a reduced clearance comprises one or more axially-extending tab portions 12 the free end of which forms a radial flange 13 axially retaining a floating washer 14 which is in sliding contact with the corresponding edge portion 9a of the cage 9. Opposite axially-extending tab portions may be provided for axially retaining another washer 14 adjacent the other opposite edge portion of the cage 9.

In FIG. 3, the elastomer collar 3 is directly engaged in the bore 1 of the support or housing B and the needles 8 are in adjoining relation to each other.

In FIGS. 4 and 5 the sleeve 6 has at one or each end an outwardly-extending radial flange 16 which, while it renders the sleeve somewhat stable as concerns shape, allows the inwardly offset segments $p$, $q$, $r$ freedom to deform radially under the action of the needles owing to the provision in the flange 16 of circumferentially-extending cut-away parts 17 which are adjacent the regions $p$, $q$, $r$ and have the same circumferential extent as the latter.

FIGS. 6 and 7 show a radial flange 26 which extends inwardly instead of outwardly as in FIGS. 4 and 5.

In the embodiment shown in FIG. 8, the radial flanges 18 are formed at the axial ends of the large-diameter segments $a$, $b$, $c$ for slidingly contacting the edge portions of the cage 9.

Having now described my invention what I claim as new and desire to secure by Letters Patent is:

1. A device for mounting a radial rolling bearing having rolling elements, comprising an elastically yieldable elastomeric collar, a thin sleeve engaged in the collar and having an inner surface which acts as a raceway for the rolling elements and defines in a plurality of angularly spaced regions a reduced clearance for the rolling elements, the collar defining an inner surface and the sleeve defining an outer surface which is coextensive with and in intimate contact with the inner surface of the collar throughout the periphery of the sleeve, the sleeve having such thinness that the sleeve has an elasticity allowing said regions to deform radially under the action of forces transmitted by the rolling elements, the sleeve being preformed in accordance with an irregular profile which defines circumferentially alternate cylindrical segments having a diameter providing a conventional radial clearance for the rolling elements and cylindrical segments which are inwardly offset and constitute regions defining a reduced radial clearance for the circulation of the rolling elements.

2. A device as claimed in claim 1, wherein the number and the circumferential extent of the inwardly offset segments are such that diametrally opposed rolling elements are simultaneously in contact with inwardly offset segments.

3. A device as claimed in claim 1, wherein there are three of said inwardly offset segments.

4. A device as claimed in claim 1, wherein the segments having a diameter defining a conventional clearance for the rolling elements comprise, at an end of the segments, radial flanges and a cage containing the rolling elements is axially retained by the radial flanges.

5. A device as claimed in claim 4, wherein the collar comprises an annular extension which defines a radial sealing lip portion which axially supports the radial flanges.

6. A device as claimed in claim 1, wherein the segments having a diameter defining a conventional clearance for the rolling elements comprise at each end of the segments radial flanges and a cage containing the rolling elements is axially retained by the flanges.

7. A device as claimed in claim 6, wherein the collar comprises adjacent each end of the collar an annular extension which defines a radial sealing lip portion which axially supports the radial flanges.

8. A device for mounting a radial rolling bearing having rolling elements, comprising an elastically yieldable collar, a thin sleeve engaged in the collar and having an inner surface which acts as a raceway for the rolling elements and defines in a plurality of angularly spaced regions a reduced clearance for the rolling elements, the sleeve having such thinness that the sleeve has an elasticity allowing said regions to deform radially under the action of forces transmitted by the rolling elements, the sleeve being preformed in accordance with an irregular profile which defines circumferentially alternate cylindrical segments having a diameter providing a conventional radial clearance for the rolling elements and cylindrical segments which are inwardly offset and constitute regions defining a reduced or zero radial clearance for the circulation of the rolling elements, the collar being internally preformed so as to have a profile which fits the profile of the thin sleeve.

9. A device for mounting a radial rolling bearing having rolling elements, comprising an elastically yieldable collar, a thin sleeve engaged in the collar and having an inner surface which acts as a raceway for the rolling elements and defines in a plurality of angularly spaced regions a reduced clearance for the rolling elements, the sleeve having such thinness that the sleeve has an elasticity allowing said regions to deform radially under the action of forces transmitted by the rolling elements, the sleeve being preformed in accordance with an irregular profile which defines circumferentially alternate cylindrical segments having a diameter providing a conventional radial clearance for the rolling elements and cylindrical segments which are inwardly offset and constitute regions defining a reduced or zero radial clearance for the circulation of the rolling elements, a cylindrical sheath surrounding and engaging the collar and for fitting into a bore of a support for the device.

10. A device as claimed in claim 9, wherein the sheath is of cardboard.

11. A device as claimed in claim 9, wherein the sheath is of plastics material.

12. A device as claimed in claim 9, wherein the sheath is of steel.

13. A device for mounting a radial rolling bearing having rolling elements, comprising an elastically yieldable collar, a thin sleeve engaged in the collar and having an inner surface which acts as a raceway for the rolling elements and defines in a plurality of angularly spaced regions a reduced clearance for the rolling elements, the sleeve having such thinness that the sleeve has an elasticity allowing said regions to deform radially under the action of forces transmitted by the rolling elements, the sleeve being preformed in accordance with an irregular profile which defines circumferentially alternate cylindrical segments having a diameter providing a conventional radial clearance for the rolling elements and cylindrical segments which are inwardly offset and constitute regions defining a reduced or zero radial clearance for the circulation of the rolling elements, the collar exerting a radial pressure on the whole of the outer surface of the sleeve.

14. A device for mounting a radial rolling bearing having rolling elements, comprising an elastically yieldable collar, a thin sleeve engaged in the collar and having an inner surface which acts as a raceway for the rolling elements and defines in a plurality of angularly spaced regions a reduced clearance for the rolling elements, the sleeve having such thinness that the sleeve has an elasticity allowing said regions to deform radially under the action of forces transmitted by the rolling elements, the sleeve being preformed in accordance with an irregular profile which defines circumferentially alternate cylindrical segments having a diameter providing a conventional radial clearance for the rolling elements and cylindrical segments which are inwardly offset and constitute regions defining a reduced oe zero radial clearance for the circulation of the rolling elements, one of the inwardly offset segments comprising an end tab portion and a floating washer, which comes into sliding contact with one of the ends of the rolling elements, being axially retained by the tab portion.

15. A device for mounting a radial rolling bearing having rolling elements, comprising an elastically yieldable collar, a thin sleeve engaged in the collar and having an inner surface which acts as a raceway for the rolling elements and defines in a plurality of angularly spaced regions a reduced clearance for the rolling elements, the sleeve having such thinness that the sleeve has an elasticity allowing said regions to deform radially under the action of forces transmitted by the rolling elements, the sleeve being preformed in accordance with an irregular profile which defines circumferentially alternate cylindrical segments having a diameter providing a conventional radial clearance for the rolling elements and cylindrical segments which are inwardly offset and constitute regions defining a reduced or zero radial clearance for the circulation of the rolling elements, a cage guiding the rolling elements and one of the inwardly offset segments having an end tab portion and a floating washer, which comes into sliding contact with an edge portion of the cage, being axially retained by the tab portion.

16. A device for mounting a radial rolling bearing having rolling elements, comprising an elastically yieldable elastomeric collar, a thin sleeve engaged in the collar and having an inner surface which acts as a race way for the rolling elements and defines in a plurality of angularly spaced regions a reduced clearance for the rolling elements, the collar defining an inner surface and the sleeve defining an outer surface which is coextensive with and in intimate contact with the inner surface of the collar throughout the periphery of the sleeve, the sleeve having such thinness that the sleeve has an elasticity allowing said regions to deform radially under the action of forces transmitted by the rolling elements, the sleeve being preformed in accordance with an irregular profile which defines circumferentially alternate cylindrical segments having a diameter providing a conventional radial clearance for the rolling elements, cylindrical segments which are inwardly offset and constitute regions defining a reduced radial clearance for the circulation of the rolling elements and a radial flange which is provided at at least one end of the sleeve and which comprises, in the region of each of the inwardly offset segments, a circumferentially-extending cut-away part allowing the corresponding inwardly offset segment to deform freely in the radial direction.

17. A device as claimed in claim 16, wherein the radial flange extends inwardly of the sleeve.

18. A device for mounting a radial rolling bearing having rolling elements, comprising an elastically yieldable collar, a thin sleeve engaged in the collar and having an inner surface which acts as a raceway for the rolling elements and defines in a plurality of angularly spaced regions a reduced clearance for the rolling elements, the sleeve having such thinness that the sleeve has an elasticity allowing said regions to deform radially under the action of forces transmitted by the rolling elements, the sleeve being preformed in accordance with an irregular profile which defines circumferentially alternate cylindrical segments having a diameter providing a conventional radial clearance for the rolling elements, cylindrical segments which are inwardly offset and constitute regions defining a radiused radial clearance for the circulation of the rolling elements and a radial flange which is provided at at least one end of the sleeve and which comprises, in the region of each of the inwardly offset segments, a circumferentially-extending cut-away part allowing the corresponding inwardly offset segment to deform freely in the radial direction, the radial flange extending outwardly of the sleeve.

19. A device for mounting a radial rolling bearing having rolling elements, comprising an elastically yieldable collar, a thin sleeve engaged in the collar and having an inner surface which acts as a raceway for the rolling elements and defines in a plurality of angularly spaced regions a reduced clearance for the rolling elements, the sleeve having such thickness that the sleeve has an elasticity allowing said regions to deform radially under the action of forces transmitted by the rolling elements, the sleeve being preformed in accordance with an irregular profile which defines circumferentially alternate cylindrical segments having a diameter providing a conventional radial clearance for the rolling elements and cylindrical segments which are inwardly offset and constitute regions defining a reduced or zero radial clearance for the circulation of the rolling elements, the collar having an annular extension which defines a radial sealing lip portion.

20. A device as claimed in claim 19, wherein the collar comprises adjacent each end of the collar an annular extension which defines a radial sealing lip portion.

21. A device for mounting a radial rolling bearing having rolling elements, comprising an elastically yieldable elastomeric collar, a thin sleeve disposed in the collar and having an inner surface which acts as a raceway for the rolling elements, the sleeve being plastically preformed in accordance with an annular profile which profile defines circumferentially alternate first cylindrical segments having an inside radius providing a conventional radial clearance for the rolling elements and second cylindrical segments which are inwardly offset and constitute regions having an inside radius defining a reduced radial clearance for the circulation of the rolling elements, said second cylindrical segments being in engaged and elastically supported relation to corresponding adjacent portions of said collar.

22. A device as claimed in claim 21, further comprising radially inwardly extending tab means on an end of the sleeve for axially retaining the rolling elements.

23. A device as claimed in claim 21, further comprising a cage for the rolling elements and radially inwardly extending tab means on an end of the sleeve for axially retaining the cage.

* * * * *